US006819871B1

(12) United States Patent
Baldwin et al.

(10) Patent No.: US 6,819,871 B1
(45) Date of Patent: Nov. 16, 2004

(54) MULTI-CHANNEL OPTICAL FILTER AND MULTIPLEXER FORMED FROM STACKS OF THIN-FILM LAYERS

(75) Inventors: David Alan Baldwin, Annadale, VA (US); Todd Lanier Hylton, Great Falls, VA (US)

(73) Assignee: 4 Wave, Inc., Sterling, VA (US)

(*) Notice: Subject to any disclaimer, the term of this patent is extended or adjusted under 35 U.S.C. 154(b) by 468 days.

(21) Appl. No.: 09/810,998

(22) Filed: Mar. 16, 2001

(51) Int. Cl.[7] .......................... H04J 14/02; G02B 27/14

(52) U.S. Cl. ............................. 398/85; 398/84; 398/87; 359/634

(58) Field of Search ............................. 398/44, 68, 85, 398/43, 101, 84, 87; 359/634, 576, 584, 585, 586, 247, 254, 633, 636

(56) References Cited

U.S. PATENT DOCUMENTS 4,541,159 A 9/1985 Michel et al.
4,589,724 A 5/1986 Winzer
4,693,544 A 9/1987 Yamasaki et al.
4,701,012 A 10/1987 Kaiser
4,824,200 A 4/1989 Isono et al.
5,119,454 A 6/1992 McMahon
5,583,683 A * 12/1996 Scobey ........................ 398/79
5,799,118 A 8/1998 Ogusu et al.
5,841,919 A * 11/1998 Akiba et al. .................. 385/37
5,894,535 A 4/1999 Lemoff et al.
5,920,411 A * 7/1999 Duck et al. ................... 398/85
6,005,718 A 12/1999 Park et al.
6,008,920 A * 12/1999 Hendrix ....................... 398/79
6,101,037 A 8/2000 Park et al.
6,122,417 A * 9/2000 Jayaraman et al. ........... 385/24
6,147,806 A * 11/2000 Park et al. .................. 359/634
6,404,947 B1 * 6/2002 Matsuda ...................... 385/24
6,553,162 B1 * 4/2003 Okayama ..................... 385/37

FOREIGN PATENT DOCUMENTS

JP 61285412 A * 12/1986 ............ G02B/6/28

* cited by examiner

*Primary Examiner*—Leslie Pascal
*Assistant Examiner*—Dalzid Singh
(74) *Attorney, Agent, or Firm*—Morgan, Lewis & Bockius LLP

(57) ABSTRACT

A multi-channel optical device includes a first plurality of optical structures formed simultaneously using vapor deposition on different regions of a common substrate. Each optical structure in the plurality is comprised of a plurality of thin-film layers. The thickness of each layer in a given optical structure corresponds to a wavelength associated with one of the channels. A reflector has a surface parallel to the common substrate, and a transport region is disposed between the first plurality of optical structures and the reflector. An aperture is disposed at one end of the transport region, and the first plurality of optical structures are disposed along a length of the transport region. When an input optical signal is provided to the aperture, the device functions as an optical demultiplexer and output optical signals associated with different ones of the channels are generated at separate positions along a length of the transport region. When input optical signals are applied to separate positions along the length of the transport region, the device functions as an optical multiplexer and those input optical signals are combined in the transport region and output as a combined optical output signal at the aperture.

22 Claims, 21 Drawing Sheets

34
λ1...λ4
40
46
43
42
45
44
12
λ2...λ4
λ3...λ4
λ4
16d
16c
16b
16a
41
λ1
λ2
λ3
λ4
x

MULTI-CHANNEL OPTICAL FILTER AND MULTIPLEXER FORMED FROM STACKS OF THIN-FILM LAYERS

FIELD OF INVENTION

The present invention is directed generally to novel systems and methods for performing sputter deposition, and to optical devices manufactured using such systems and methods.

BACKGROUND OF THE INVENTION

Existing optical filtering systems use a collection of thin film filters to demultiplex multiple optical channels on a single fiber. In such devices, a plurality of filters are separately manufactured and then later arranged on a single substrate, or they are deposited individually on a single substrate with a sequence of masking and deposition operations to create each filter. Each filter is designed to pass a single wavelength channel. Those channels that are not passed through the first filter are reflected toward the next filter which is designed to pass a single channel which is different from the single channel that passes through the first filter. Those channels that are not passed through the second filter are reflected in a similar manner and either pass through or are reflected by each subsequent filter. Existing optical multiplexers work similarly, but the optical signals flow in an opposite direction. As those skilled in the art will appreciate, the execution of this process for making such devices is complicated by the fact that each filter is manufactured separately, thereby requiring precise alignment of each separate filter on the substrate during deposition or at a later stage in packaging, in order to ensure proper operation of the device. The present invention discloses novel optical filters and multiplexers, and methods for performing optical filtering and optical multiplexing that represent simplified and more reliably, processes when compared to existing systems and methods.

SUMMARY OF THE INVENTION

The present invention is directed to an optical demultiplexer and a method for separating an input optical signal into a plurality of channels by wavelength. A first plurality of optical structures are formed simultaneously using vapor deposition on different regions of a first common substrate. Each optical structure in the first plurality is comprised of a plurality of thin-film layers. The thickness of each layer in a given optical structure in the first plurality is associated with one of the channels. A reflector has a surface parallel to a surface of the first common substrate, and a transport region is disposed between the first plurality of optical structures and the reflector. At least one aperture is disposed at one end of the transport region, and the first plurality of optical structures are disposed along a length of the transport region. Output optical signals associated with different ones of the channels are generated at separate positions along the length of the transport region when the input optical signal is provided to the at least one aperture.

The present invention is further directed to an optical multiplexer that combines a plurality of input optical signals differing in wavelength to form a combined signal at an output aperture. The optical multiplexer comprises a first plurality of optical structures formed simultaneously on different regions of a first common substrate using vapor deposition, each optical structure in the first plurality is composed of a plurality of thin-film layers. The thickness of each layer in a given optical structure in the first plurality is associated with one of a plurality of different optical channels. A reflector has a surface parallel to a surface of the first common substrate, and a transport region is positioned between the first plurality of optical structures and the reflector. At least one output aperture is disposed at one end of the transport region, and the first plurality of optical structures are disposed along a length of the transport region. When the input optical signals are respectively provided to the plurality of optical structures at the separate positions, a plurality of filtered signals each one of which corresponds to one of the different optical channels are merged in the transport region to form the combined signal which is outputted from the multiplexer through the at least one output aperture.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention. In the Drawings.

DETAILED DESCRIPTION OF THE PREFERRED EMBODIMENTS

Figure 1:
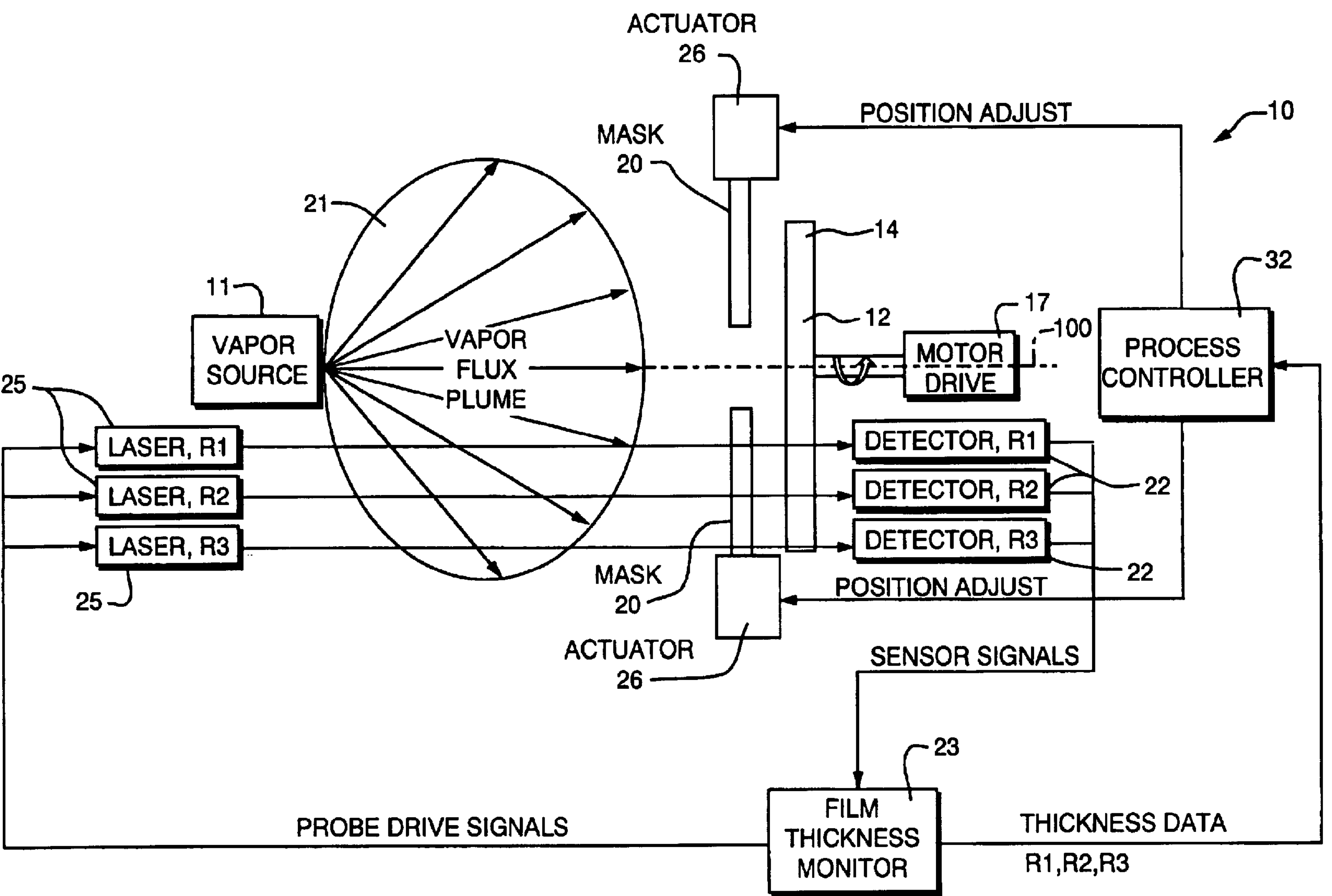
FIG. 1 is a diagram of a system for making thin-film structures using a stepped profile mask according to the present invention.

There is shown in FIG. 1, a system 10 for manufacturing thin-film structures that are disposed on a substrate 12 of a wafer 14. In one embodiment shown in FIG. 2, the thin-film structures 16*a*, 16*b*, 16*c*, 16*d* are initially formed in the shape of bands on substrate 12. Each of the thin-film structures 16*a*, 16*b*, 16*c*, 16*d* is formed by depositing material (from a vapor source 11) on substrate 12. In one embodiment, each of the thin-film structures (or bands) 16*a*, 16*b*, 16*c*, 16*d* is formed from a different thickness of deposited material (or deposition thickness) on substrate 12. Although the present invention is described as having four thin-film structures on substrate 12, it will be understood by those skilled in the art that the teachings of the present invention can be applied to produce other numbers of thin-film structures (each having a different deposition thickness) simultaneously on substrate 12 by simply varying the number of steps in mask 20 as described below.

Referring now to FIGS. 1–4, the deposition thicknesses of the layers of each thin-film structure (or band) 16*a*, 16*b*, 16*c*, 16*d* vary along a radius 13 of the substrate 12. For example, the deposition thickness of each layer in band 16*a* is different from the deposition thickness of each layer in band 16*b*, which is different from the deposition thickness in band 16*c*, which is different from the deposition thickness of each layer in band 16*d*. Thus, although the deposition thickness of each layer within each band is generally uniform, the deposition thickness of each layer varies from band to band. In the embodiment shown in FIGS. 2–3, the deposition thickness of each layer of each successive band decreases as the diameter of the bands expand. However, it will be understood by those skilled in the art that the deposition thickness of each layer of each successive band could be made to increase as the diameter of the bands increases, simply by altering the shape of mask 20.

System 10 includes a motor 17 that rotates the substrate 12 about an axis 100 of rotation. In the embodiment shown, axis 100 is generally perpendicular to the deposition surface of substrate 12. System 10 also includes a vapor source 11 of deposited material 15 that is directed at the rotating substrate 12. Vapor source 11 creates a vapor flux plume 21 that is disposed proximate the substrate 12. Material from the vapor flux plume 21 is deposited on the rotating substrate 12. Examples of vapor source 11 include a negatively biased target that is sputtered by a self-generated plasma, a target that is sputtered by an ion beam, and a solid charge that is heated sufficiently to cause evaporation. Other vapor sources are well known in the art and can be used for implementing the present invention. In one embodiment, vapor source 11 includes a target that is sputtered with a divergent beam ion source such as a Mark II ion source from Veeco Instruments that generates an ion beam that is generally directed about a central axis and wherein the ion current magnitude varies throughout the beam as the cos$\theta$, where $\theta$ is the angle between the central axis of the divergent ion beam and the direction of the ion current within the beam. A further embodiment includes both said divergent beam ion source and additionally a negative target bias with DC, various types of pulsed-DC, or RF waveforms.

Figure 2:
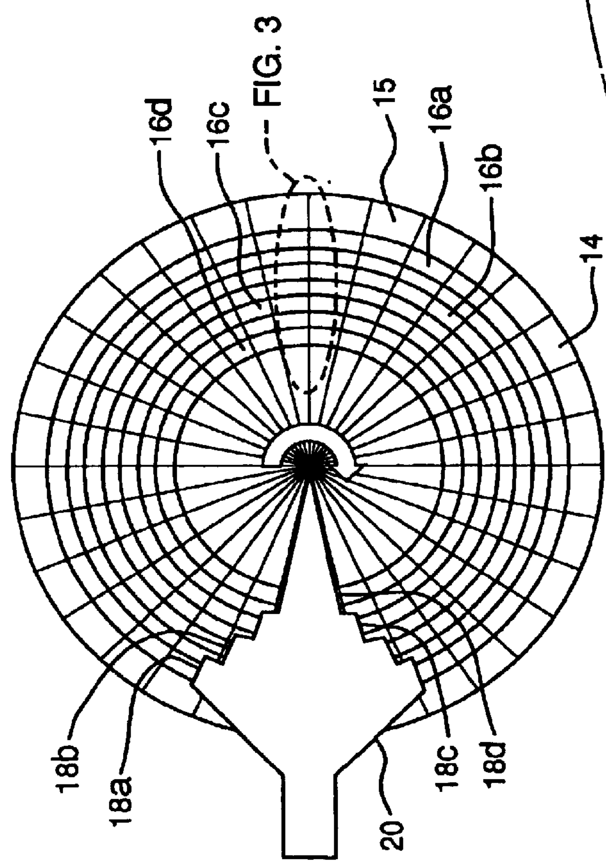
FIG. 2 is a diagram showing use of the stepped shaper to create bands of deposited material having different thicknesses on a substrate.

The system 10 further includes a mask 20 that has a stepped profile. As shown in FIG. 2, each step 18*a*, 18*b*, 18*c*, 18*d* of the profile corresponds to one of the respective bands 16*a*, 16*b*, 16*c* or 16*d* formed on substrate 12. As mentioned above, it should be recognized by those skilled in the art that the number of steps 18 on the mask 20 and the number and thicknesses of the various bands on the wafer 14 are not limited to the embodiment shown. Mask 20 is positioned between the rotating substrate 12 and the vapor source 11. Mask 20 acts to selectively block material in vapor plume 21 from reaching and being deposited on substrate 12. The amount of material blocked by mask 20 depends on the size of the shadow of mask 20 cast on substrate 12 at any given position along radius 13. In one embodiment, the mask 20 is fixed and does not rotate or pivot.

The system 10 also includes at least one actuator 26 that varies a shadow 28 of a second mask 30 that is disposed over the rotating substrate 12. The radius 13 is measured from the axis 100 of rotation of the rotating substrate 12. System 10 also includes at least one optical detector 22 that monitors the different respective thicknesses of the bands 16*a*, 16*b*, 16*c*, 16*d* that are disposed along the radius 13 of the wafer 14. In one embodiment, optical detector(s) 22 monitor the thicknesses by probing the different thicknesses of bands 16*a*, 16*b*, 16*c*, 16*d* with light. A process controller 32 is coupled to the optical detector(s) 22 and the actuator 26. In response to deposition thickness data supplied from the detectors 22, the process controller 32 may vary the shadow 28 of the mask 30 along a radius 13 of the substrate 12 to control the thicknesses of the bands 16*a*, 16*b*, 16*c*, 16*d* as they are being formed on substrate 12, or terminate the deposition when a desired thickness is reached.

Figure 4:
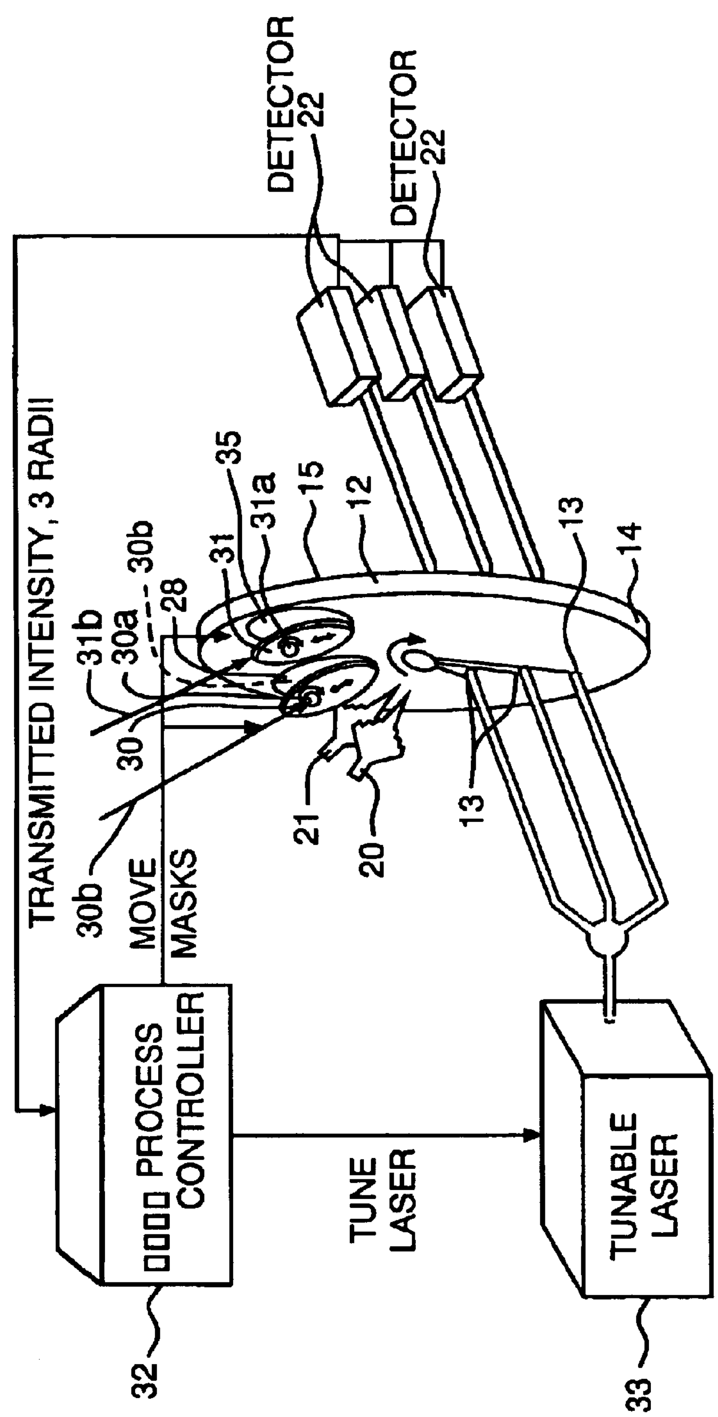
FIG. 4 is a further diagram showing various components of the system of FIG. 1.

As shown in FIG. 4, a shadow 35 of a third mask 31 is disposed over the rotating substrate 12. The process controller 32 optionally varies the shadow 35 of the third mask 31 along a radius 13 of the substrate 12 to compensate for unwanted variations in deposition thickness within a particular band 16*a*, 16*b*, 16*c*, 16*d*.

In one embodiment, each actuator 26 varies a corresponding shadow 35, 28 by pivoting a corresponding mask 31, 30 about a pivot point 31*a*, 30*a*. In a further embodiment, each actuator 26 varies a corresponding shadow 35, 28, respectively, by "tilting" or rotating the respective mask 31, 30 about the central axes 31*b*, 30*b* of the corresponding masks 31 and 30. It will be understood by those skilled in the art that each shadow 35, 28 could be varied using a combination of the methods described above, or by moving masks 31 and 30 in other ways such as along (or parallel to) a radius of the substrate 12.

Although in the embodiment shown, substrate 12 is circular in shape, it will be understood that a substrate 12 that is square or some other shape could also be used with the present invention. In such a case, radius 13 would simply correspond to a line in the plane of the surface of substrate 12 and perpendicular to axis 100.

In the embodiment of FIG. 1, a film thickness monitor 23 is coupled to the deposition thickness detectors 22 and one or more lasers 25, each of which corresponds to to one of the deposition thickness detectors 22. In another embodiment as shown in FIG. 2, laser 25 may be a tunable laser 33. It should be recognized by those skilled in the art that the functions of process controller 32 and the film thickness monitor 23 may be combined into a single controller.

A method for manufacturing thin-film structures disposed on a substrate 12 using the system 10 as shown in FIGS. 1–4 will now be described. The method comprises the steps of rotating a substrate 12 and directing a source 11 of deposited material 15 at the rotating substrate 12. At least one optical detector 22 monitors the different respective thicknesses of the bands being formed along the radius 13 of the wafer 14 by probing the different bands with light. The shadows 35 and 28 of masks 31 and 30 disposed over the rotating substrate 12 are varied with actuators 26. Optical detector 22 and actuators 26 are coupled to the process controller 32. In response to deposition thickness data from at least one optical detector 22, the process controller varies the shadows 35 and 28 of the masks 31 and 30 along the radius 13 of the substrate 12 to control and compensate for unwanted variations in deposition thickness. The method of the present invention allows multiple optical structures to be formed simultaneously, and layer-by-layer, on a common substrate. This method reduces the costs of manufacture, facilitates integration of multiple optical structures into a single combined optical filter or multiplexer, and results in higher yields and densities of optical structures for a given substrate. The present invention also allows optical structures of a reduced size to be formed on a substrate, thereby lowering the optical loss and increasing the performance of such structures during use.

Figure 3:
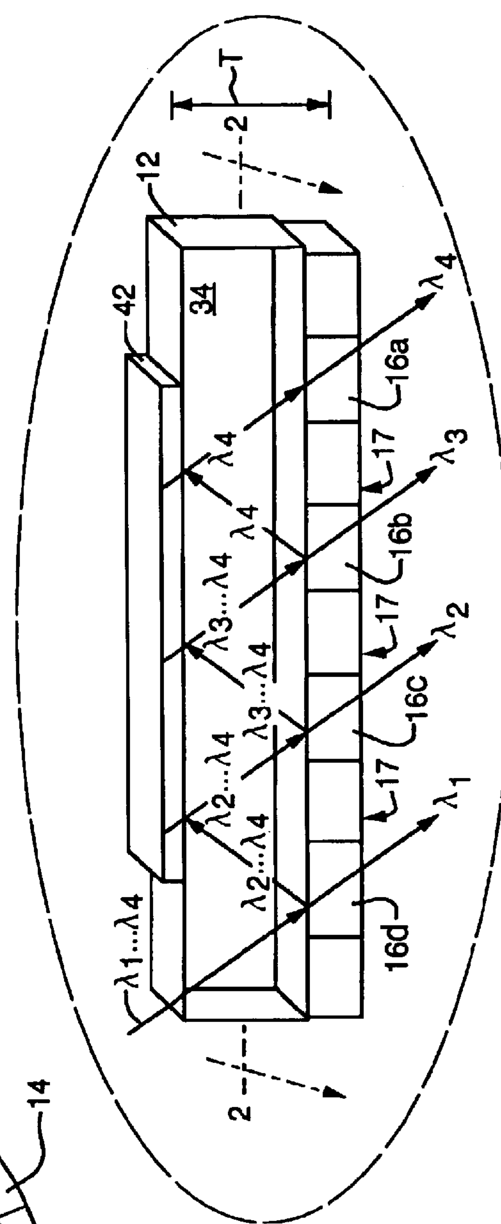
FIG. 3 is a cross-section of an optical filter created from a section of the wafer shown in FIG. 2.
Figure 5:
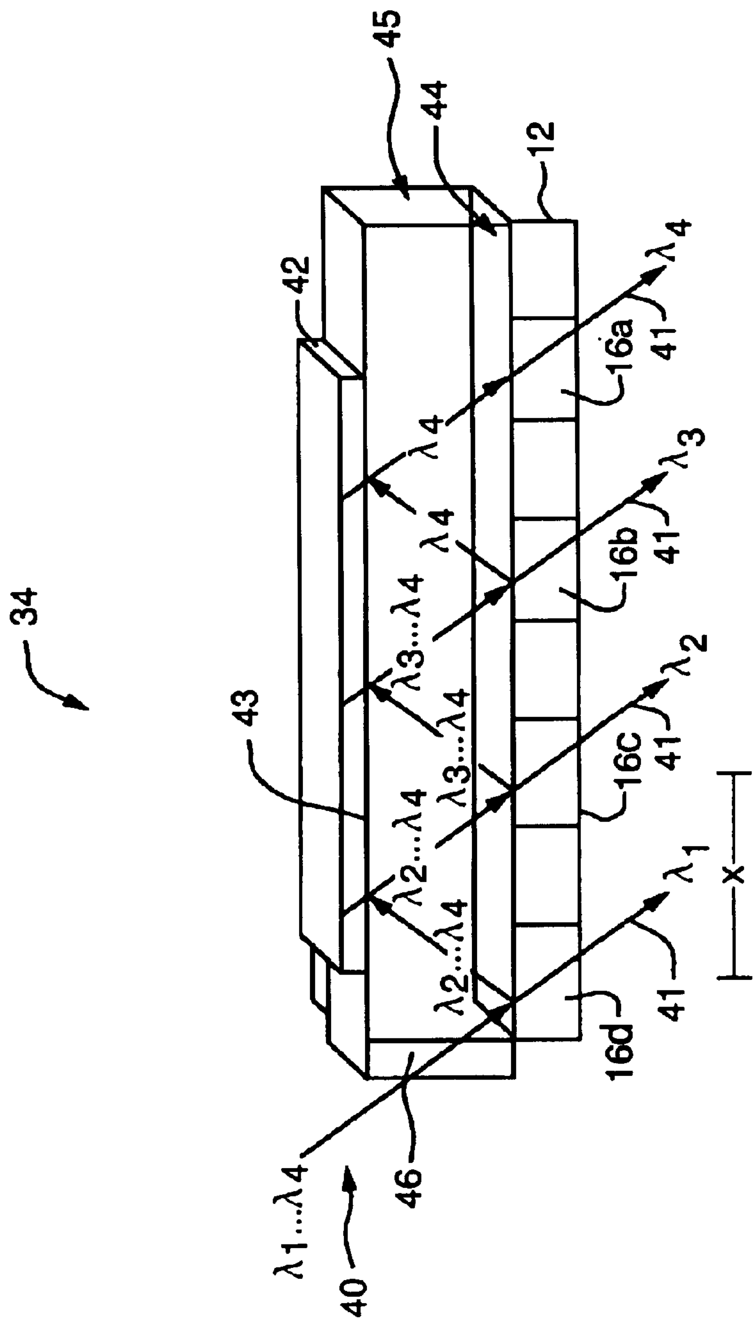
FIG. 5 is further view of the optical filter shown in FIG. 3.

The system and process described above may be advantageously used to create an optical filter 34. When the present invention is used to form an optical filter 34, the substrate 12 is preferably formed of a glass or other optically transparent material wafer, the material deposited on the substrate is a metal oxide or metal flouride layer stack, and the thicknesses of the material deposited on the substrate at each band 16*a*, 16*b*, 16*c*, 16*d*, respectively, corresponds to one of the wavelengths of light that the filter will serve to isolate. After the wafer 14 is formed as shown in FIG. 2, the wafer 14 is then sliced into segments such as that shown in FIG. 3 in order to form each optical filter. As shown in FIGS. 3 and 5, an optical filter capable of isolating multiple wavelengths of light may be formed by affixing or depositing a reflector 42 on the side of substrate 12 opposite thin-film structures 16*a*, 16*b*, 16*c*, 16*d*. According to the method of the present invention, the reflector 42 may be affixed or deposited either before or after slicing wafer 14 into segments. Optionally, wafer 14 or its sliced segments may be thinned by known grinding, lapping and/or polishing methods prior to affixing or depositing reflector 42.

In FIG. 5 there is illustrated a further view of multi-channel optical filter 34. Filter 34 functions as an optical demultiplexer and separates an input optical signal 40 into a plurality of channels 41 by wavelength. The filter 34 comprises a first plurality of optical structures 16 that have been formed simultaneously using vapor deposition on different regions of a first common substrate 12 using the methods described above. For purposes of clarity, the optical structures 16 are illustrated in FIG. 5 as being arranged in a discontinuous pattern, with an inter-channel transition structure 17 positioned between each adjacent pair of optical structures. As discussed in more detail below, the inter channel transition structure may be comprised of the same material used to form the filters, air, or a light blocking material or mask. The light blocking mask prevents light from passing between adjacent optical structures 16*a*, 16*b*, 16*c*, 16*d*. Regardless of the transition structure, in one embodiment the spacing between the center of adjacent optical structures 16 is described by the equation:

$$2(T)/\tan\theta;$$

where T=the transport region thickness, and θ=incident angle of light with respect to a plane of the substrate.

Each optical structure 16 in the first plurality is composed of a plurality of thin-film layers. The thickness of each layer in any given optical structure 16 in the first plurality of structures is associated with the wavelength of one of the optical signal channels 41.

The optical filter 34 further comprises a reflector 42 having a surface 43 parallel to a surface 44 of the first common substrate 12. A transport region 45 separates the reflector 42 from the first plurality of the optical structures 16. The transport region 45 may be glass or any other transport media having the property of transparency, flatness and rigidity which are commonly known to those skilled in the art.

An aperture 46 is disposed at one end of the transport region 45. Such aperture may comprise a combination of lenses, mirrors or other optical elements. When the input optical signal 40 is provided to the aperture 46, output optical signals at different wavelengths (i.e. $\lambda_1$, $\lambda_2$, $\lambda_3$, $\lambda_4$,) associated with different ones of the channels are generated at separate positions along a length of the transport region 45. The function is known as demultiplexing. In one embodiment each of the first plurality of optical structures 16 on the first common substrate 12 corresponds to a different one of the channels 41, and transmits light at a wavelength corresponding to that channel but reflects light at all of the other wavelengths corresponding to channels 41.

In one embodiment of the present invention, the reflector 42 of the optical filter 34 is a mirror. Where the reflector 42 is a mirror, it may be a metal mirror or a dielectric mirror.

Figure 6:
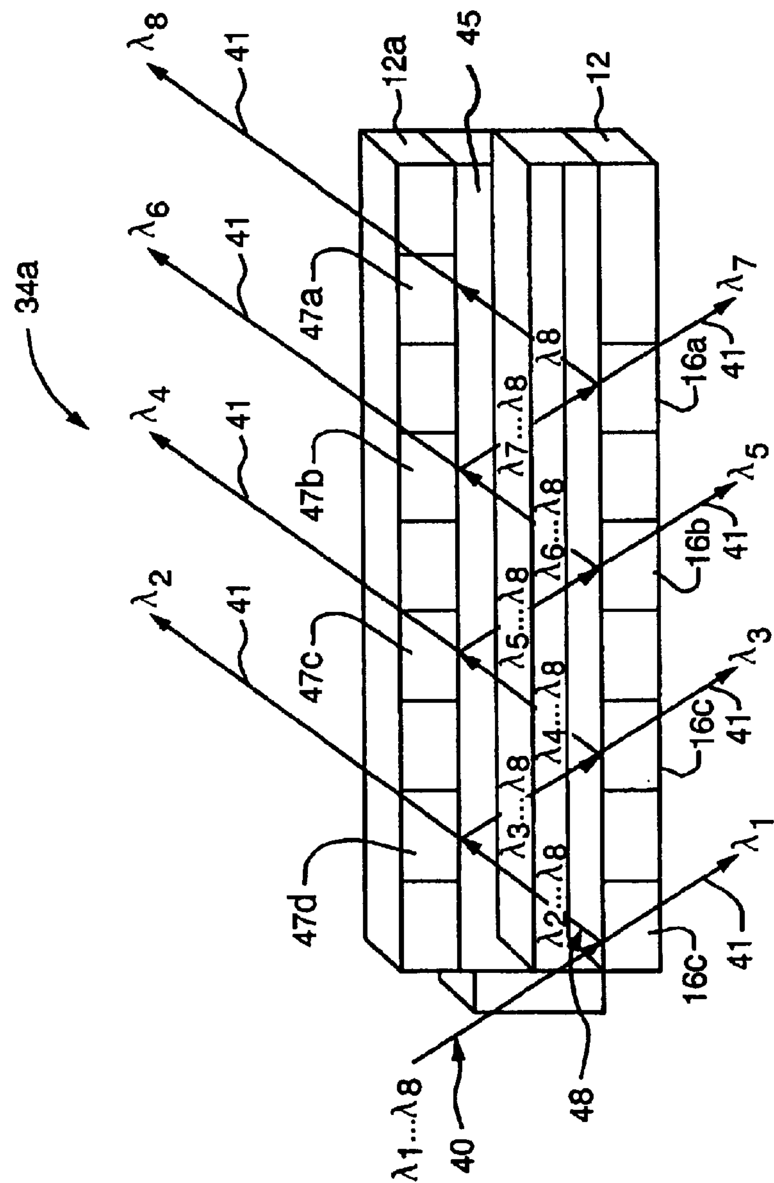
FIG. 6 is a diagram of a second embodiment of the thin film filter with a second plurality of optical structures disposed on different regions of a second common substrate according to the present invention.

In FIG. 6, there is shown still another embodiment of the invention. Optical filter 34*a* is comprised of a second plurality of optical structures 47 disposed on different regions of a second common substrate 12*a*. The second common substrate 12*a* is aligned in parallel with the first common substrate 12. Each optical structure 47 in the second plurality is composed of a plurality of thin-film layers, and is formed simultaneously using vapor deposition on different regions of substrate 12*a* using the methods described above. The thickness of each layer in a given optical structure 47 in the second plurality is associated with one of the channels 41. The initial signal 40 of this embodiment is first incident upon one of the first plurality of optical structures 16 which filters a single channel and reflects the remaining signal channels. The reflected signal 48 is then incident upon one of the second plurality of optical structures 47 which filters another single channel and reflects the remaining signal channels. The reflected signal 48 thereafter progresses through the transport region alternating between one of the first plurality of optical structures 16 and one of the second plurality of optical structures 47. With each contact with an optical structure 16, 47 a single channel is filtered from the reflected signal 48.

In the embodiment shown in FIG. 6, the transport region 45 between the first and second plurality of optical structures 16, 47 is glass. In another embodiment shown in FIG. 7, the transport region 45 is air.

The invention also includes a method of separating an input optical signal 40 into a plurality of channels by wavelength using, for example, a multi-channel optical filter such as filter 34, 34*a*, or 34*b*. Devices performing this function are commonly called demultiplexers. The method comprises the step of providing a first plurality of simultaneously deposited optical structures 16. The optical structures 16 are disposed on different regions of a first common substrate 12. Each optical structure 16 in the first plurality is composed of a plurality of thin-film layers. In this method, the thickness of each layer in a given optical structure 16 in the first plurality is associated with one of the channels. A reflector having a surface parallel to a surface of the first common substrate 12 is also provided. The optical filter has a transport region 45 between the first plurality of the optical structures 16 and the reflector 42, and an aperture 46 disposed at one end of the transport region. When the input optical signal is provided to the aperture, output optical signals are generated at separate positions along a length of the transport region, each of the output optical signals being associated with a different one of the channels.

Figure 7:
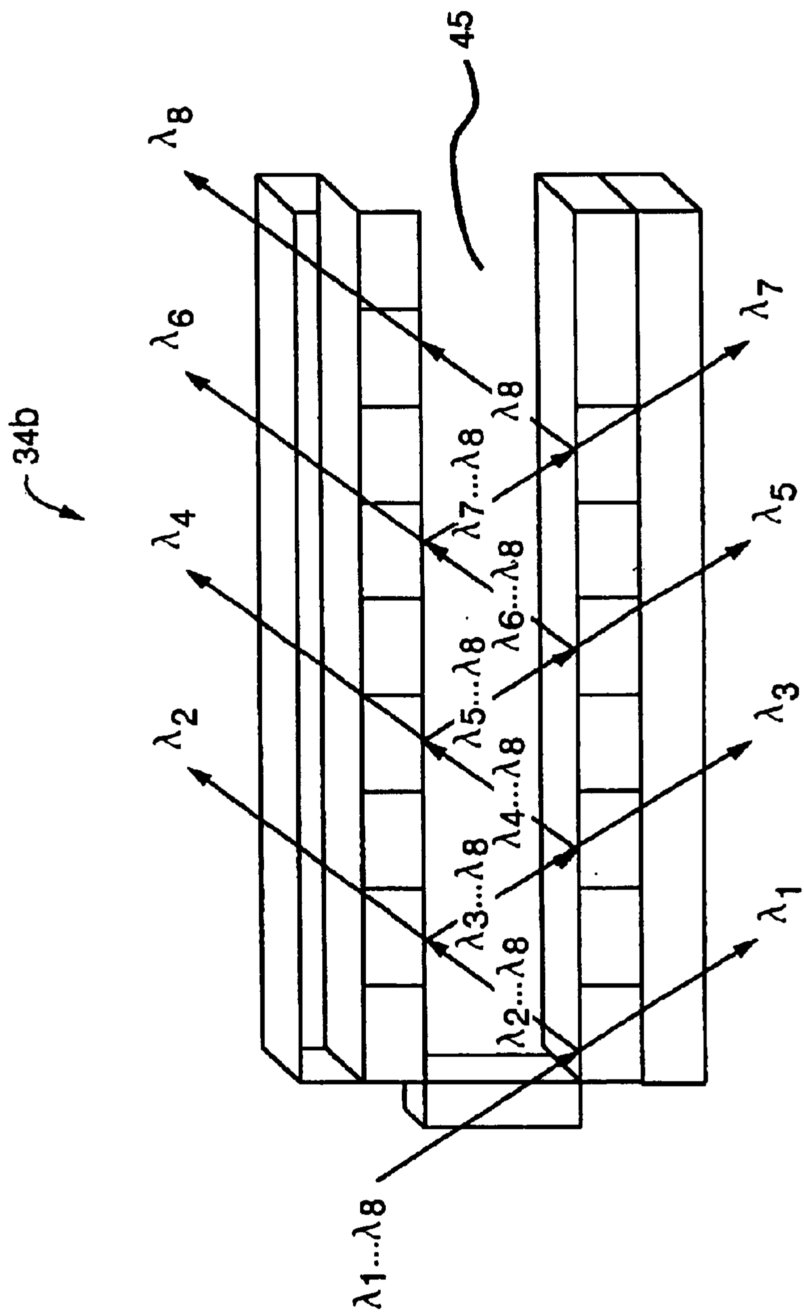
FIG. 7 is a diagram of a third embodiment of the thin film filter having opposing glass substrates with air in between according to the present invention.
Figure 8:
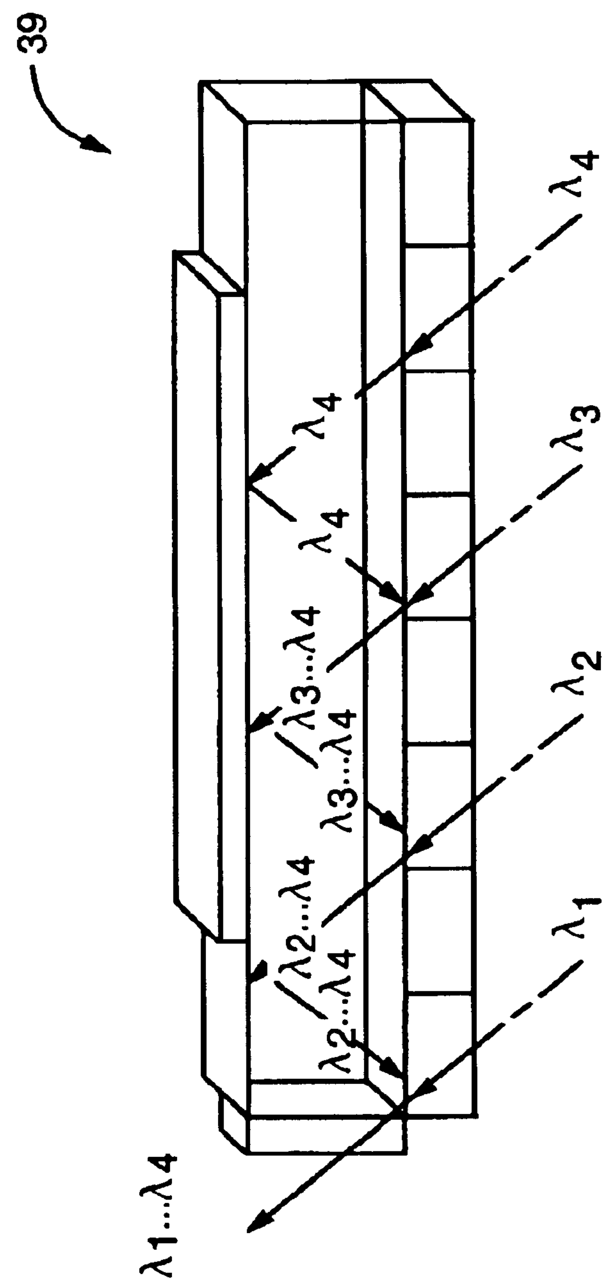
FIG. 8 is a cross-section of an optical multiplexer formed from a section of the wafer shown in FIG. 2.
Figure 9:
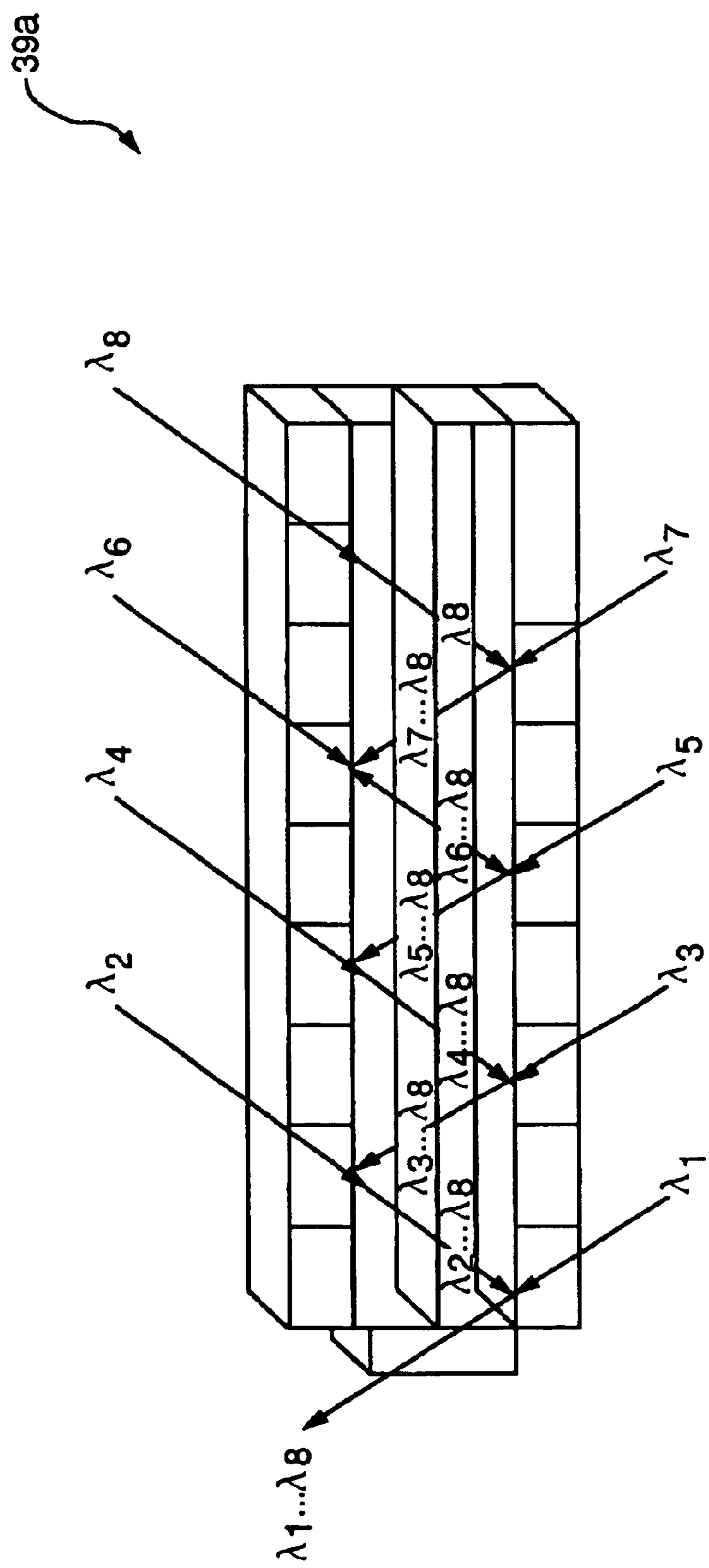
FIG. 9 is a diagram of a second embodiment of a thin film optical multiplexer with a second plurality of optical structures disposed on different regions of a second common substrate according to the present invention.
Figure 10:
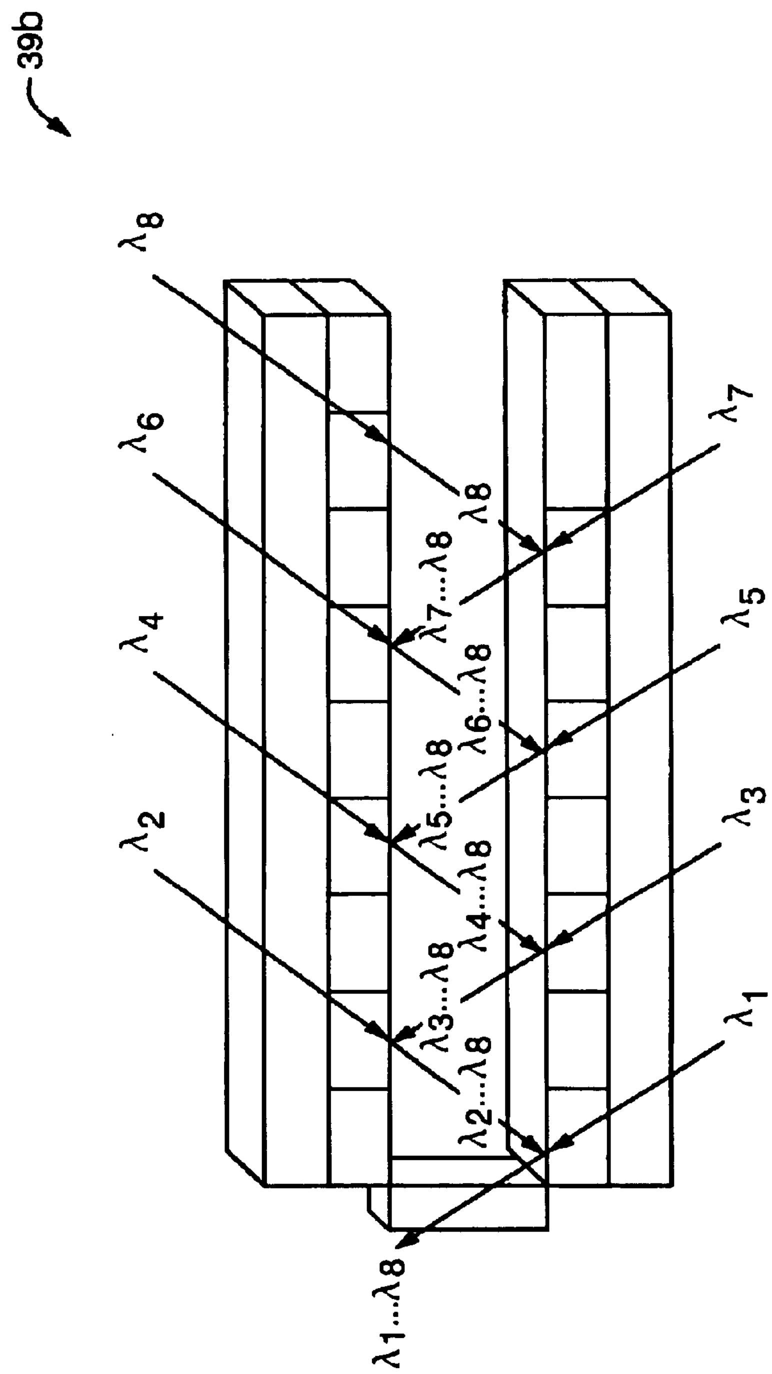
FIG. 10 is a diagram of a third embodiment of a thin film optical multiplexer having opposing glass substrates with air in between according to the present invention.

In FIGS. 8–10, there are shown further alternate embodiments 39, 39*a*, 39*b* of the present invention. The embodiments 39, 39*a*, 39*b* are similar to the embodiments 34, 34*a*,

34*b* shown in FIGS. 6–8 respectively, with the exception that the invention shown is an optical multiplexer. It will be recognized by those skilled in the art that an optical multiplexer may be formed by reversing the direction of the outputs shown in the embodiments of the optical filters to form an optical multiplexer. The multiplexer combines a plurality of different input optical signals to form a combined signal at an output aperture.

FIGS. 11A–11J illustrate several methods for manufacturing various embodiments of optical filters and multiplexers, in accordance with the present invention. Optical filter 51 (shown in FIG. 11A) is substantially the same as optical filter 34 (FIG. 3), except that the generalized inter-channel transition structures are shown for a particular embodiment in filter 51. In optical filter 51, the inter-channel transition regions 52, 54, 56, are formed of the same material used to form the optical structures themselves, with the thicknesses of the various layers in the optical structures transitioning gradually between each pair of adjacent optical structures. Optical filter 51 may be formed using the system of FIG. 1. Without use of the masks described in connection with FIGS. 11B–11J, the gradually transitioning between each adjacent pair of optical structures will occur without further intervention as a consequence of use of stepped profile mask 20 as described above.

Figures 11A, 11K:
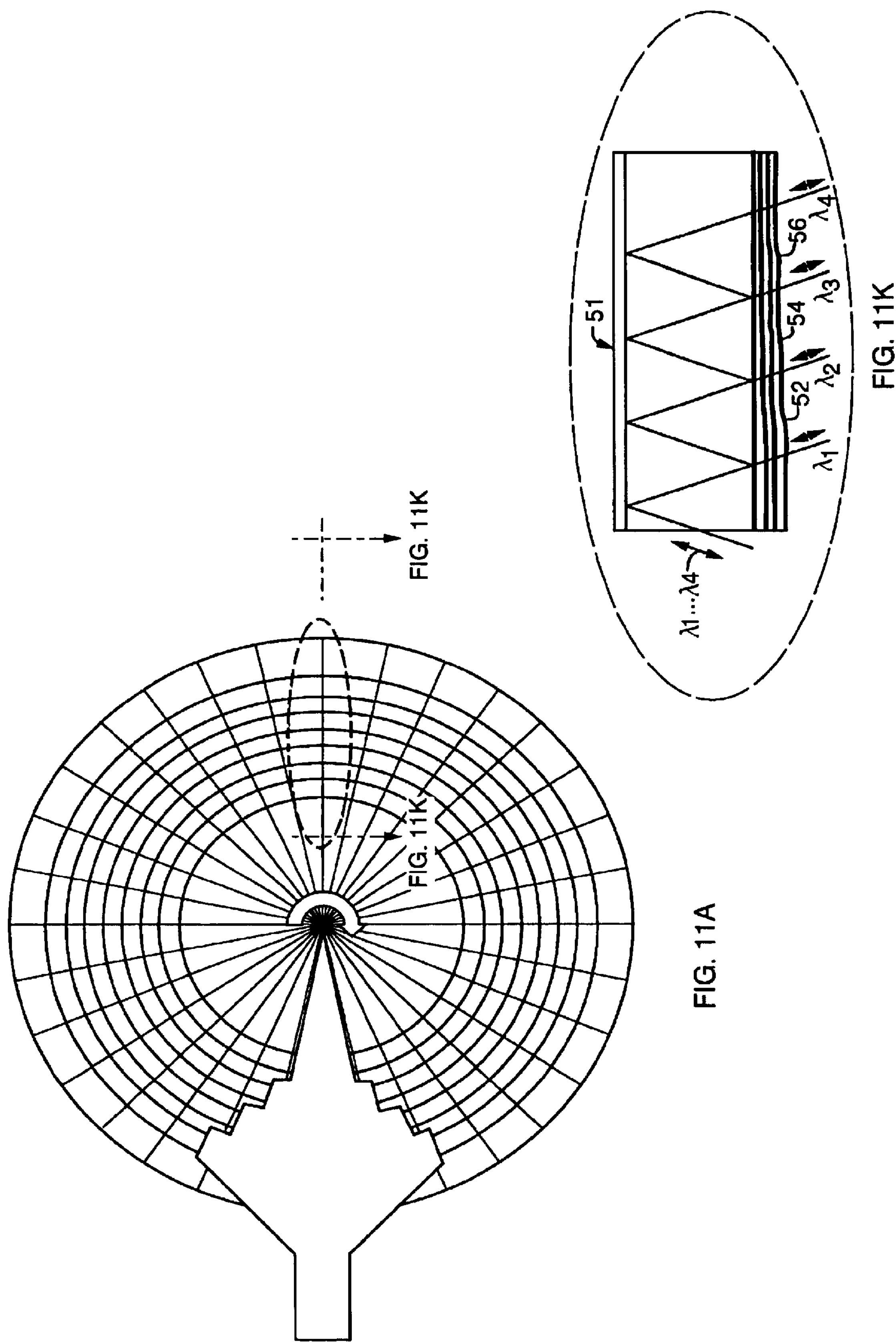
FIGS. 11A–11J illustrate several methods for manufacturing various embodiments of optical filters and multiplexers, in accordance with the present invention.
Figure 11B:
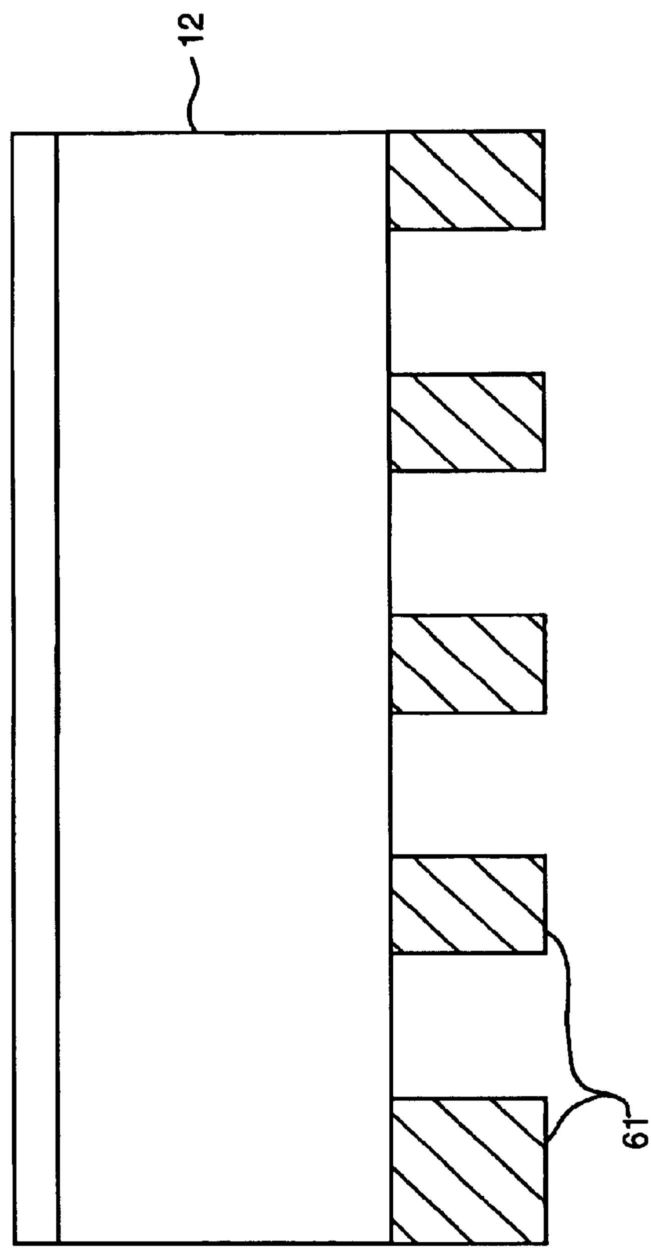
Figure 11C:
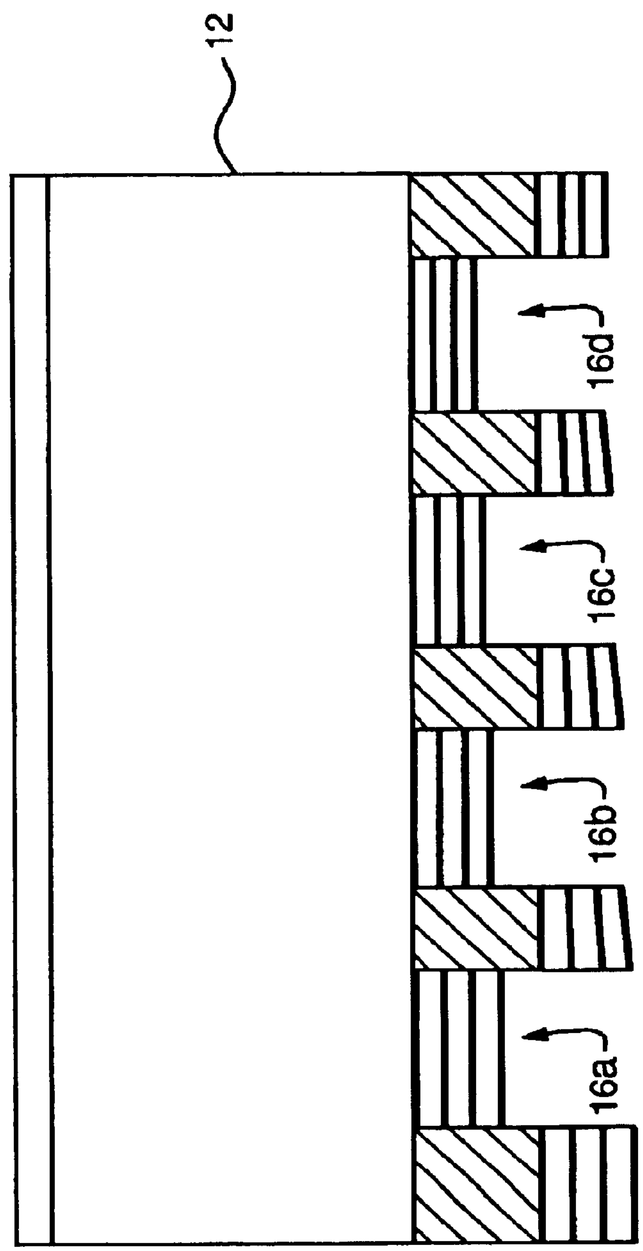
Figure 11D:
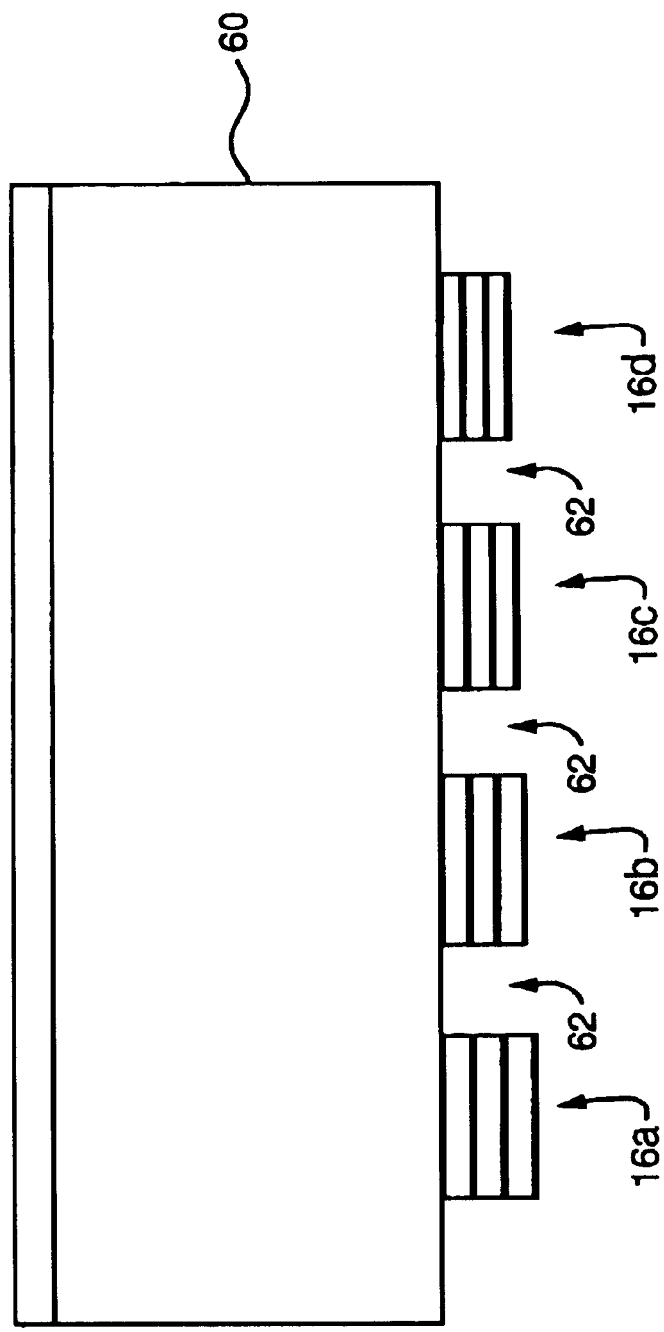
Figure 11E:
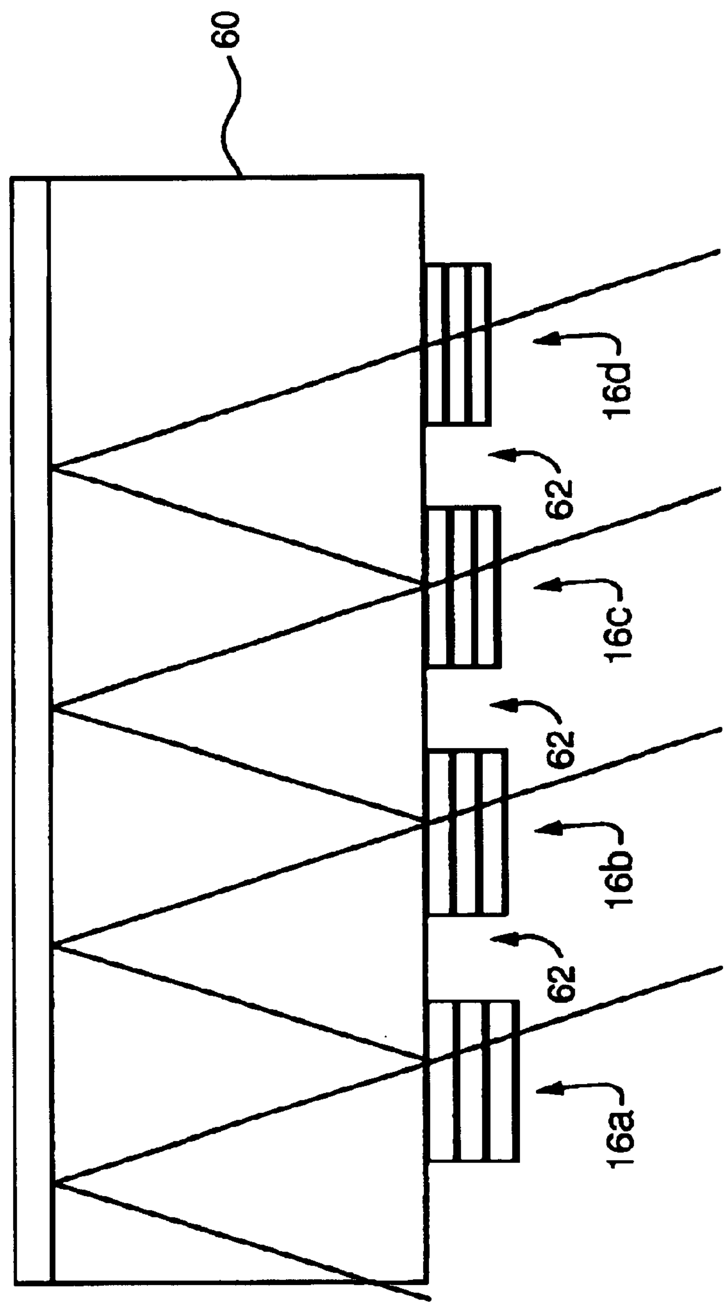
Figure 11F:
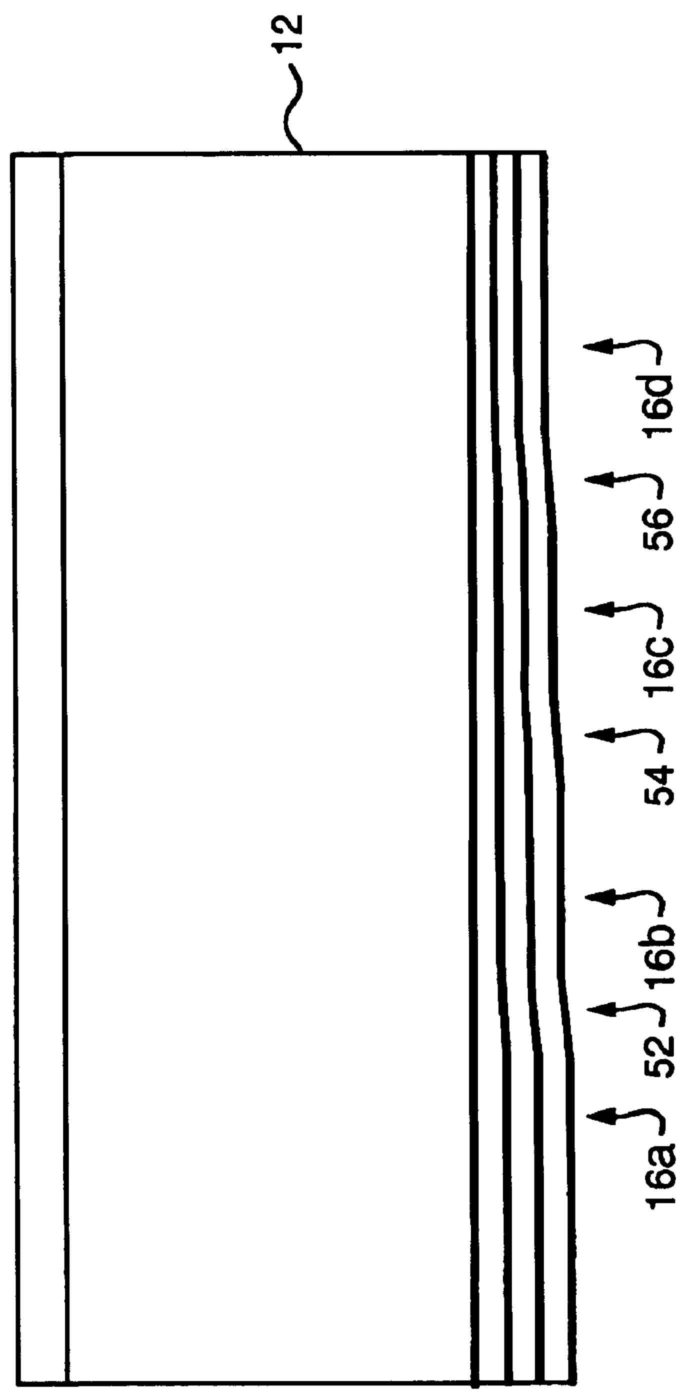

Referring now to FIGS. 11B–11E, there is shown a method for manufacturing optical filter 60 (FIG. 11E), in accordance with the present invention. In filter 60, an inter-channel transition structure 62 formed of air is positioned between each adjacent pair of optical structures. Referring now to FIG. 11B, there is shown a bare substrate 12 with a sacrificial mask material 61 applied thereon at all positions which are transition regions between adjacent pairs of optical structures. The sacrificial mask material 61 may be photoresist applied and patterned by methods standard in semiconductor fabrication art, a metal contact mask or other types of known masks. Next, the system of FIG. 1 is used to deposit thin film structures 16*a*, 16*b*, 16*c*, 16*d* upon substrate 12, with the result depicted in FIG. 11C. Subsequently the mask material 61, plus incidental thin film deposition on top of mask material 61, is removed by solvent dissolution of the polymer/resist mask, by lift-off of the metal contact mask or by other appropriate known method, to yield the structure of FIG. 11D. After the wafer is formed as in FIG. 2, the wafer is sliced into segments such as that shown in FIG. 3 in order to form each optical filter. As shown in FIG. 11E, in operation the filter of structure shown in FIG. 11D constitutes a multi-channel optical filter/multiplexer/demultiplexer substantially similar in function to 34 and 39.

Figure 11G:
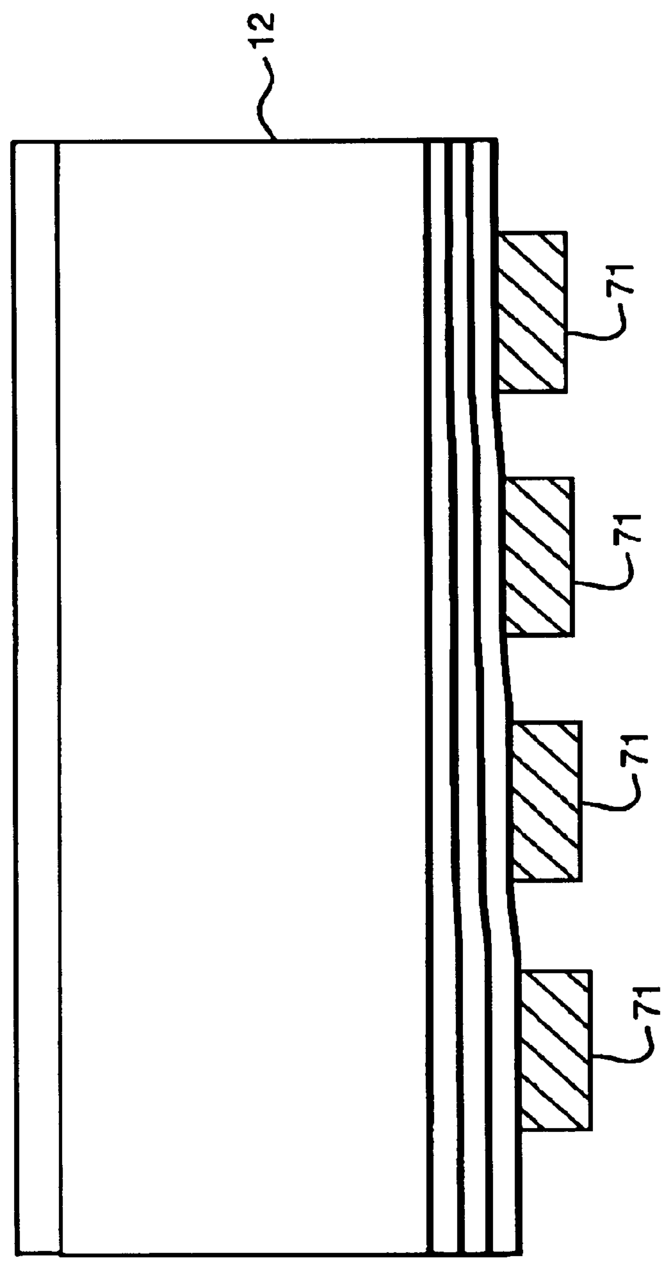
Figure 11H:
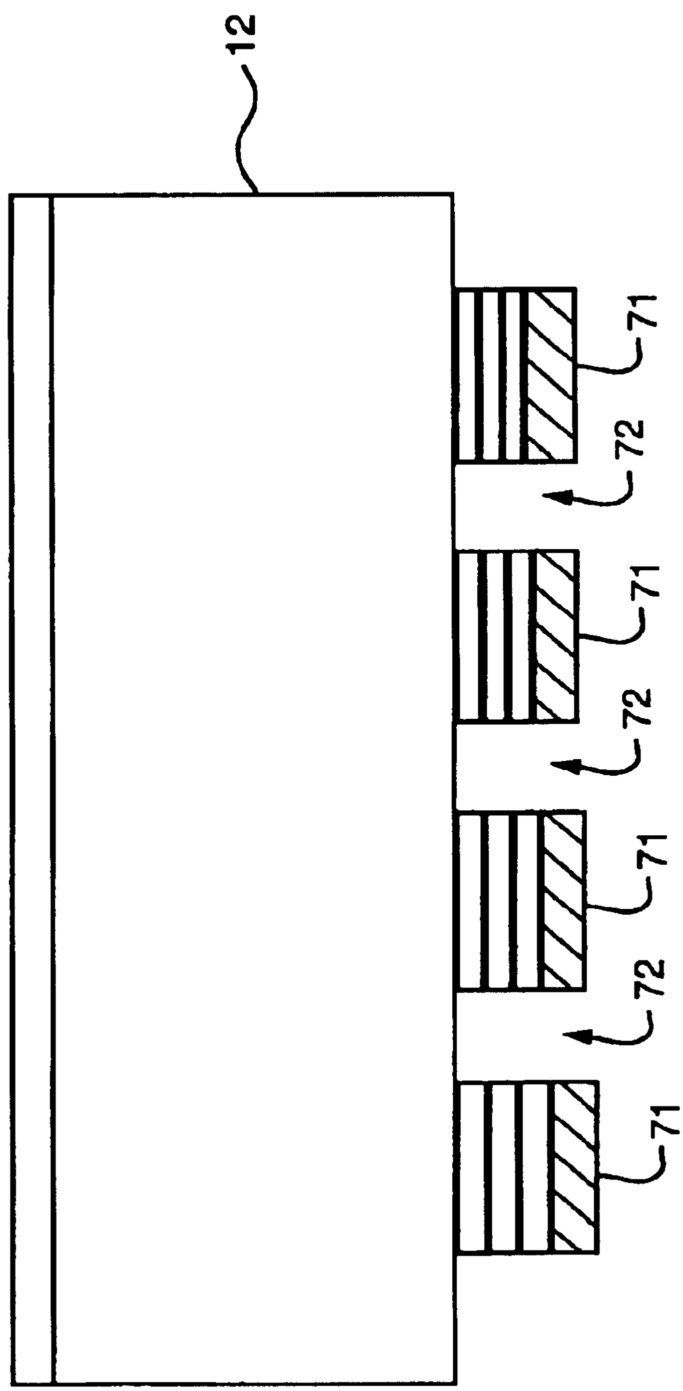
Figure 11I:
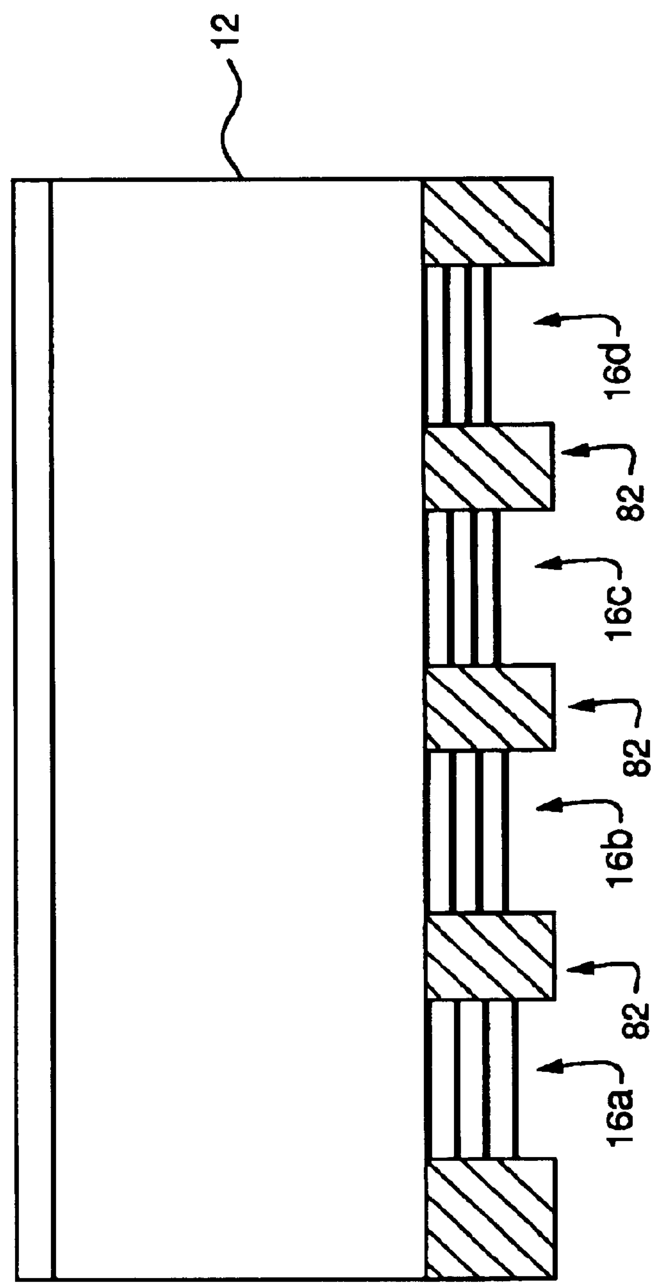
Figure 11J:
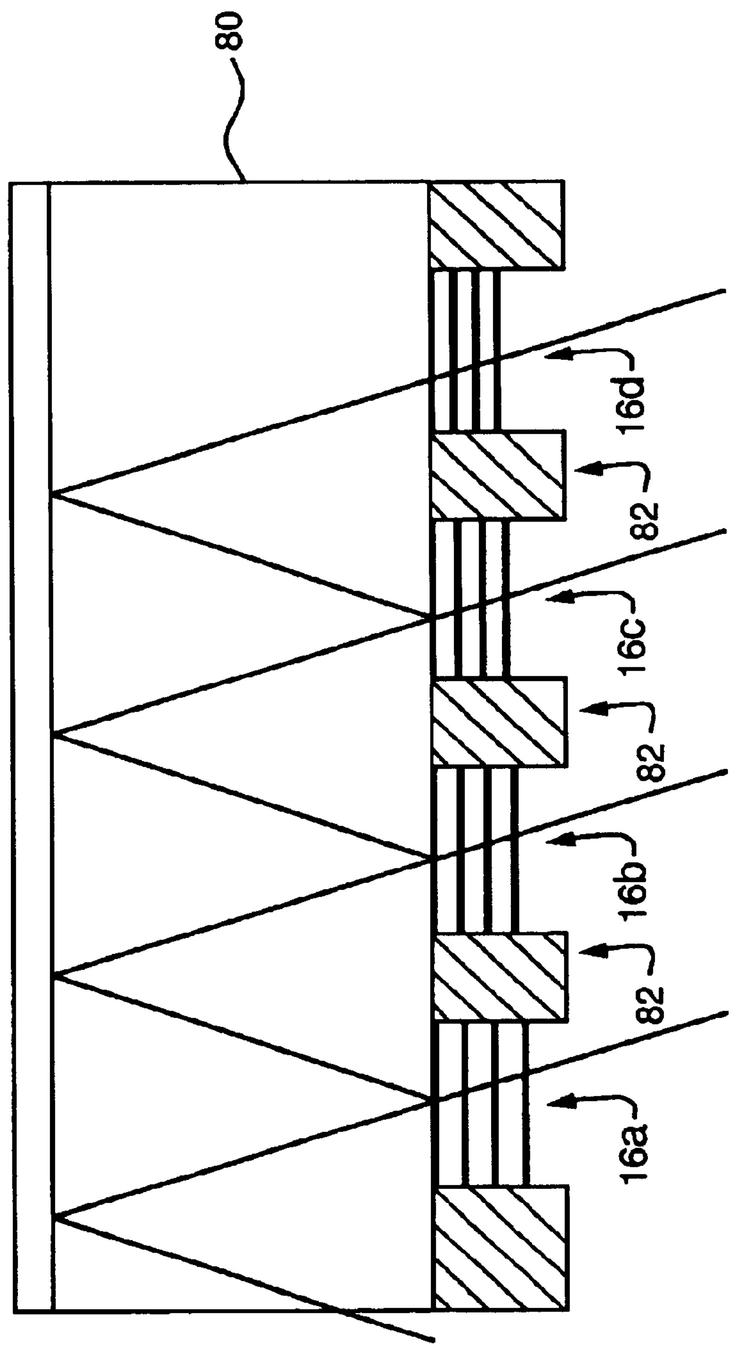

Referring now to FIGS. 11D and 11F–11H, there is shown a further method for manufacturing optical filter 60 (FIG. 11D), in accordance with the present invention. In filter 60, an inter-channel transition structure 62 formed of air is positioned between each adjacent pair of optical structures. Initially, the system of FIG. 1 is used to deposit "continuous" thin film structures 16*a*, 16*b*, 16*c*, 16*d* along with their respective gradual transition regions 52, 54, 56, upon substrate 12, with the result depicted in FIG. 11F. FIG. 11G depicts a sacrificial mask material 71 applied on top of the deposited thin films at all positions where are the optical structures 16*a*, 16*b*, 16*c*, 16*d* are located. The sacrificial mask material 71 may be photoresist applied and patterned by methods standard in semiconductor fabrication art, a metal contact mask or other types of known masks. Then the thin films in transition regions 52, 54, 56 are etched away by any of several known methods, including ion beam milling, reactive plasma etching, reactive ion etching, chemically-assisted ion beam etching, wet chemical etching and others, to yield the structure shown in FIG. 11H. Subsequently the mask 71, which may have itself been etched somewhat by the etching process, is removed by solvent dissolution of the polymer/resist mask, by lift-off of the metal contact mask or by other appropriate known method, to yield the structure of FIG. 11D.

Referring now to FIGS. 11B, 11C, 11I and 11J, there is shown a method for manufacturing optical filter 80 (FIG. 11J), in accordance with the present invention. In filter 80, an inter-channel transition structure formed of a permanent light blocking mask 82 is positioned between each adjacent pair of optical structures. The permanent mask material 82 may be a light-absorbing photoresist applied and patterned by methods standard in semiconductor fabrication art, a carbon-black-filled polymer mask applied through a silk screen then cured or may be other types of known light blocking masks. In the first step, a mask 82 is created with structure equivalent to mask 61 of FIG. 11B. Next, the system of FIG. 1 is used to deposit thin film structures 16*a*, 16*b*, 16*c*, 16*d* upon substrate 12, with the result depicted in FIG. 11C. Subsequently the thin film on top of the permanent mask and preferably a portion of the top of the permanent mask is removed by a standard planar grinding or polishing method, for example chemical-mechanical polishing or random-movement lapping with abrasive slurry on a porous pad, to yield the structure shown in FIG. 11I. After the wafer is formed as in FIG. 2, the wafer is sliced into segments such as that shown in FIG. 3 in order to form each optical filter. In operation, the filter of structure shown in FIG. 11I constitutes a multi-channel optical filter/multiplexer/demultiplexer substantially similar in function to 34 and 39.

Figure 12:
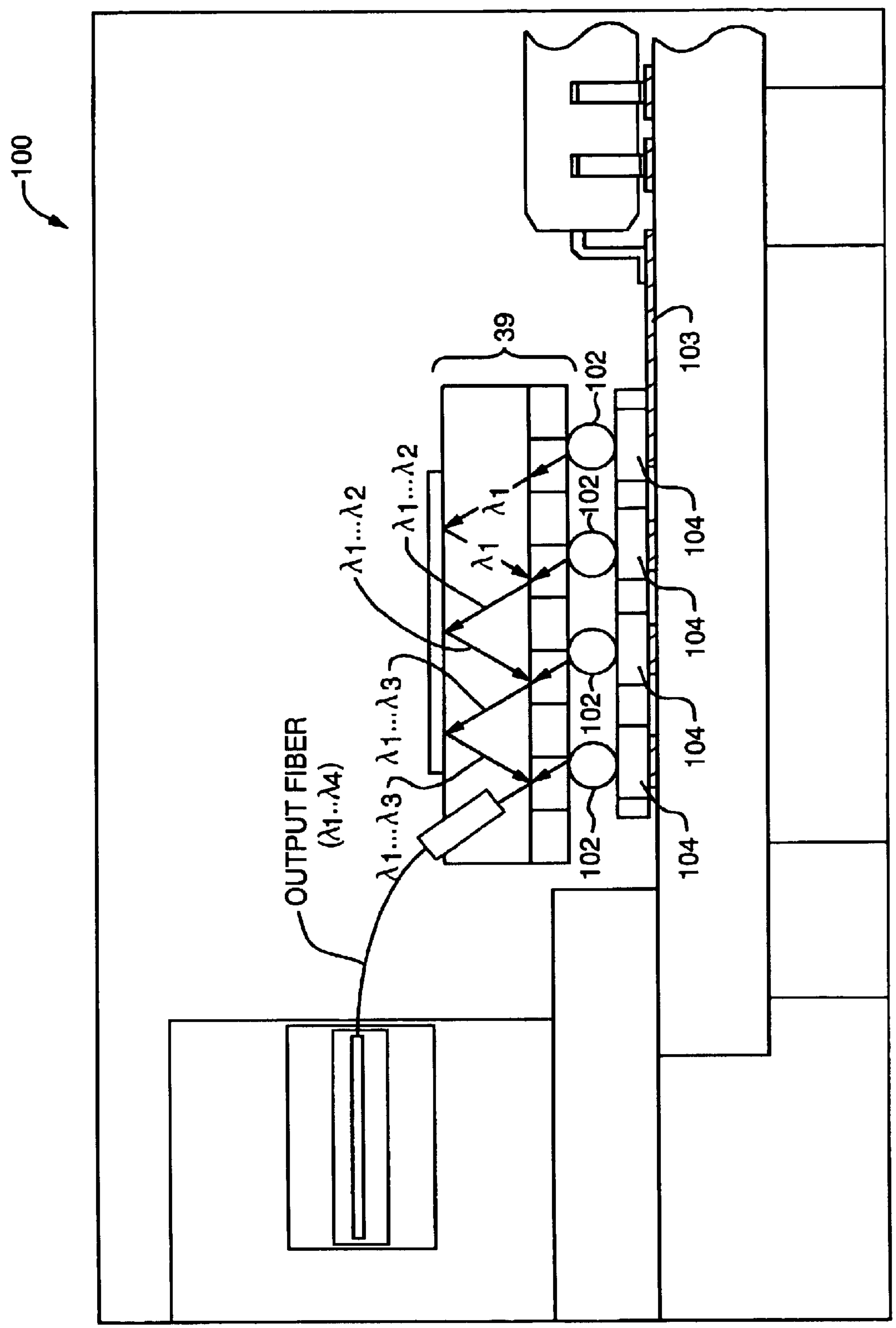
FIG. 12 illustrates an optical transmitter formed in an integrated package according to the present invention.

Referring now to FIG. 12, there is shown a diagram illustrating an optical transmitter formed in a single integrated package, according to the present invention. Optical transmitter 100 includes an array of laser diodes 104 which have been surface mounted to board 103. An optical focusing lens 102 is optionally positioned immediately above each laser diode 104. An optical multiplexer 39 is then affixed immediately above the lenses 102. The array of laser diodes 104, lenses 102, and optical multiplexer 39 may be combined into a single integrated optical package, that can then be surface mounted on circuit board 103. During operation of transmitter 100, a different electrical signal is provided to each of the laser diodes 104. In response to these electrical signals, a different optical signal is generated by each laser diode 104. Each optical signal is then focused by a corresponding one of the lenses 102, and then provided to one of the optical structures 16 in multiplexer 39. As shown in FIG. 12, each of the optical structures 16 in multiplexer 39 is tuned to pass a particular wavelength of light. The various wavelengths passed by each of the optical structures 16 are combined in the transport region of multiplexer 39, and then outputted from transmitter 100 through an output optical fiber. The output optical fiber carries a multiplexed optical signal corresponding to a combination the electrical signals provided to the laser diodes 104.

Figure 13:
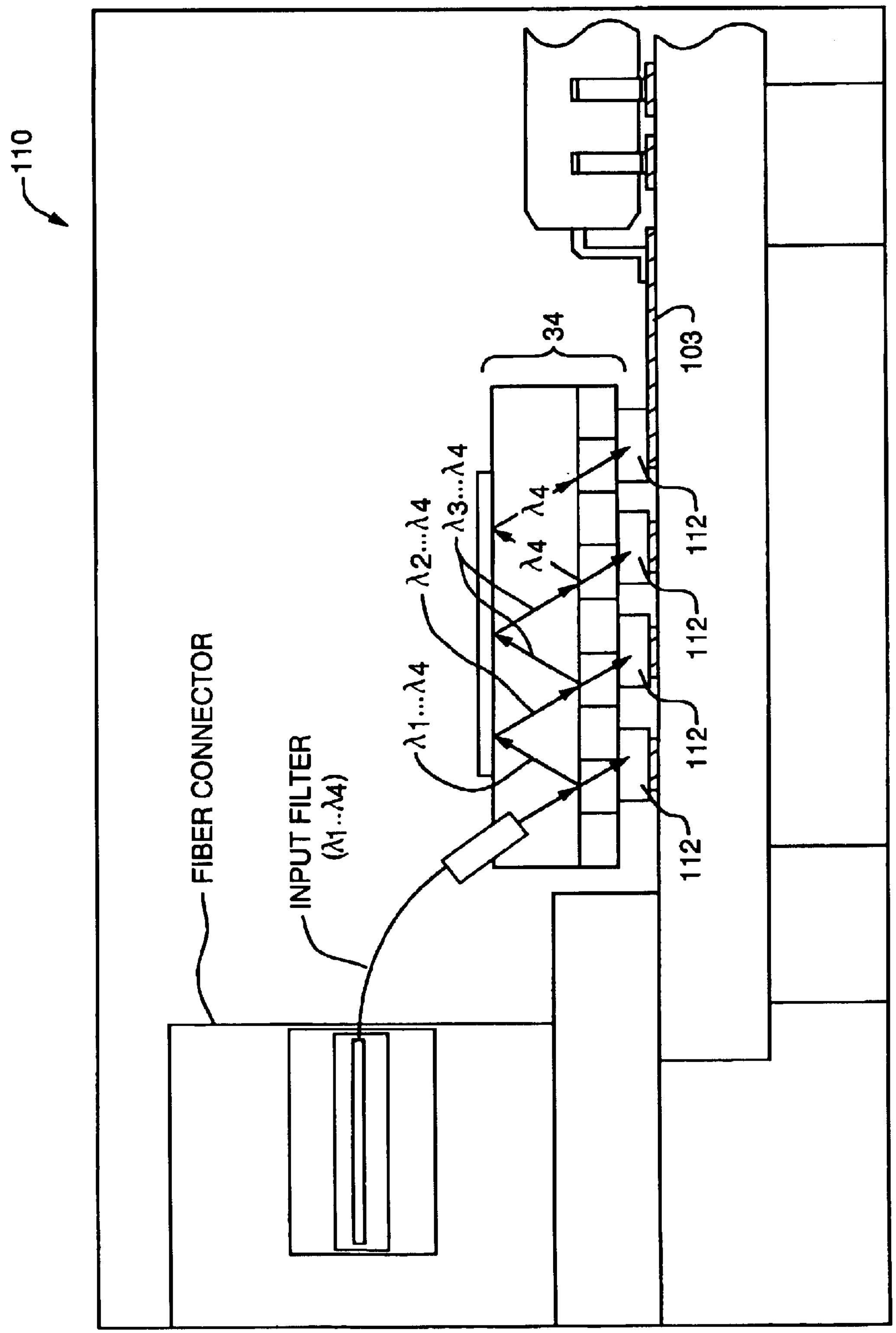
FIG. 13 illustrates an optical receiver formed in an integrated package according to the present invention.

Referring now to FIG. 13, there is shown a diagram illustrating an optical receiver formed in a single integrated package, according to the present invention. Optical receiver 110 includes an array of photo diodes 112 which have been surface mounted to board 103. An optical filter 34 is then affixed immediately above the photo diodes 112. The array of photo diodes 112 and optical filter 34 may be combined into a single integrated optical package, that can then be surface mounted on circuit board 103. During operation of receiver 110, an input optical fiber carries a multiplexed optical signal representing a combination of optical signals at different wavelengths. The multiplexed optical signal is provided to the transport region of filter 34, where it is sequentially applied to each of the optical structures 16. As shown in FIG. 13, each of the optical structures 16 in filter 34 is tuned to pass a particular wavelength of light. Optical signals (each of which corresponds to a particular wavelength) then pass out of filter 34 and are provided to the photo diodes 112. Each photo diode 112 converts one of the optical signals output from filter 34 into a corresponding electrical signal. In this embodiment, lenses may be placed between photo diodes 112 and optical filter 34 to improve device performance (as illustrated analogously in FIG. 12 for an optical transmitter).

Other embodiments of integrated transmitters (or receivers) may stack and bond separate chips containing optical filters 34, arrays of lenses 102 and arrays of lasers 104 (or photo diodes 112). In these embodiments, multiple device units might be stacked and bonded and then diced from the resulting structure to yield individual devices. The purpose of such assemblies and techniques is to reduce size and cost, improve alignment of the separate optical structures, and improve performance of the resulting assemblies. These assemblies may then be packaged or mounted directly on an optical circuit board to function with other optical and electrical elements.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. An optical demultiplexer that separates an input optical signal into a plurality of channels by wavelength, comprising:

(a) a first plurality of optical structures formed simultaneously on different regions of a first common substrate using vapor deposition, each optical structure in the first plurality being comprised of a plurality of thin-film layers, wherein each of the plurality of thin-film layers in at least a first optical structure in the first plurality has a first substantially uniform thickness that is associated with a first channel, each of the plurality of thin-film layers in a second optical structure in the first plurality has a second substantially uniform thickness that is associated with at least a second optical channel different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, each of the plurality of thin-film layers in the gradient transition region having a thickness equal to the first substantially uniform thickness at the first end, each of the plurality of thin-film layers in the gradient transition region having a thickness equal to the second substantially uniform thickness at the second end, and wherein the thickness of each of the plurality of thin-film layers throughout the gradient transition region is greater than or equal to the first substantially uniform thickness and less than or equal to the second substantially uniform thickness;

(b) a reflector having a surface parallel to a surface of the first common substrate;

(c) the optical demultiplexer having a transport region between the first plurality of the optical structures and the reflector, and an aperture disposed at at least one end of the transport region, wherein the first plurality of optical structures are disposed along a length of the transport region; and (d) wherein, when the input optical signal is provided to the aperture, output optical signals associated with at least the first and second channels are generated at separate positions along the length of the transport region.

2. The optical demultiplexer of claim 1, wherein the reflector is a mirror.

3. The optical demultiplexer of claim 2, wherein the mirror is a metal mirror.

4. The optical demultiplexer of claim 2, wherein the mirror is a dielectric mirror.

5. The optical demultiplexer of claim 1, wherein each of the first plurality optical structures on the first common substrate are vapor deposited a first side of the first common substrate and the mirror is deposited on a second side of the first common substrate opposite and parallel to the first side.

6. The optical demultiplexer of claim 1, wherein the reflector comprises a second plurality of optical structures formed using vapor deposition on different regions of a second common substrate aligned in parallel with the first common substrate, each optical structure in the second plurality being comprised of a plurality of thin-film layers, the thickness of each of the plurality of thin-film layers in a given optical structure in the second plurality being associated with one of the channels.

7. The optical demultiplexer of claim 6 wherein the transport region between the first and second plurality of optical structures is air.

8. The optical demultiplexer of claim 1, wherein each of the first plurality of optical structures on the first common substrate are vapor deposited on a first side of the first common substrate and the reflector comprises a second plurality of optical structures formed using vapor deposition on different regions of a second side of the first common substrate, the second side of the first common substrate being opposite and parallel to the first side, each optical structure in the second plurality being comprised of a plurality of thin-film layers, the thickness of each of the plurality of thin-film layers in a given optical structure in the second plurality being associated with one of the channels.

9. A method of separating an input optical signal into a plurality of channels by wavelength, the method comprising the steps of:

(a) providing a first plurality of optical structures formed simultaneously using vapor deposition on different regions of a first common substrate, each optical structure in the first plurality being comprised of a plurality of thin-film layers, wherein each of the plurality of thin-film layers in at least a first optical structure in the first plurality has a first substantially uniform thickness that is associated with a first channel, each of the plurality of thin-film layers in at least a second optical structure in the first plurality has a second substantially uniform thickness that is associated with a second optical channel different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, each of the plurality of thin-film layers in the gradient transition region having a thickness equal to the first substantially uniform thickness at the first end, each of the plurality of thin-film layers in the gradient transition region having a thickness equal to the second substantially uniform thickness at the second end, and wherein the thickness of each of the plurality of thin-film layers throughout the gradient transition region is greater than or equal to the first substantially uniform thickness and less than or equal to the second substantially uniform thickness;

(b) providing a reflector having a surface parallel to a surface of the first common substrate;

(c) providing a transport region between the first plurality of the optical structures and the reflector, and an aperture disposed at at least one end of the transport region, wherein the first plurality of optical structures are disposed along a length of the transport region; and (d) generating at separate positions along the length of the transport region output optical signals associated with at least the first and second channels when the input optical signal is provided to the aperture.

10. An optical multiplexer that combines a plurality of different wavelength input optical signals to form a combined signal at an output aperture, comprising:

(a) a first plurality of optical structures formed simultaneously on different regions of a first common substrate using vapor deposition, each optical structure in the first plurality being comprised of a plurality of thin-film layers, wherein each of the plurality of thin-film layers in at least a first optical structure in the first plurality has a first substantially uniform thickness that is associated with a first channel, each of the plurality of thin-film layers in at least a second optical structure in the first plurality has a second substantially uniform thickness that is associated with a second optical channel different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, each of the plurality of thin-film layers in the gradient transition region having a thickness equal to the first substantially union thickness at the first end, each of the plurality of thin-film layers in the gradient transition region having a thickness equal to the second substantially uniform thickness at the second end, and wherein the thickness of each of the plurality of thin-film layers throughout the gradient transition region is greater than or equal to the first substantially uniform thickness and less than or equal to the second substantially uniform thickness;

(b) a reflector having a surface parallel to a surface of the first common substrate;

(c) the optical multiplexer having a transport region between the first plurality of optical structures and the reflector, and at least one output aperture disposed at one end of the transport region, wherein the first plurality of optical structures are disposed along a length of the transport region; and (d) wherein, when the input optical signals are respectively provided to the first and second optical structures at the separate positions, a plurality of signals each one of which corresponds to one of the different optical channels are merged in the transport region to form the combined signal which is outputted from the multiplexer through the at least one output aperture.

11. The optical multiplexer of claim 10, wherein the reflector is a mirror.

12. The optical multiplexer of claim 11, wherein the mirror is a metal mirror.

13. The optical multiplexer of claim 11, wherein the mirror is a dielectric mirror.

14. The optical multiplexer of claim 10, wherein each of the first plurality optical structures on the first common substrate are vapor deposited a first side of the first common substrate and the mirror is deposited on a second side of the first common substrate opposite and parallel to the first side.

15. The optical multiplexer of claim 10, wherein the reflector comprises a second plurality of optical structures formed using vapor deposition on different regions of a second common substrate aligned in parallel with the first common substrate, each optical structure in the second plurality being comprised of a plurality of thin-film layers, the thickness of each of the plurality of thin-film layers in a given optical structure in the second plurality being associated with one of the channels.

16. The optical multiplexer of claim 15 wherein the transport region between the first and second plurality of optical structures is air.

17. The optical multiplexer of claim 10, wherein each of the first plurality of optical structures on the first common substrate are vapor deposited on a first side of the first common substrate and the reflector comprises a second plurality of optical structures formed using vapor deposition on different regions of a second side of the first common substrate, the second side of the first common substrate being opposite and parallel to the first side, each optical structure in the second plurality being comprised of a plurality of thin-film layers, the thickness of each of the plurality of thin-film layers in a given optical structure in the second plurality being associated with one of the channels.

18. An optical demultiplexer that separates an input optical signal into a plurality of channels by wavelength, comprising:

(a) a first plurality of optical structures formed simultaneously on different regions of a first common substrate using vapor deposition, each optical structure in the first plurality being comprised of a plurality of thin-film layers, wherein a first optical structure in the first plurality has a first substantially uniform thickness that is associated with first optical channel, a second optical structure in the first plurality has a second substantially uniform thickness that is associated with a second optical channel that is different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, the first end of the gradient transition region having a thickness equal to the first substantially uniform thickness, the second end of the gradient transition region having a thickness equal to the second substantially uniform thickness, and wherein the thickness of the entire gradient transition between the first end and the second end is greater than or equal to the first substantially uniform thickness and less than or equal to the second substantially uniform thickness;

(b) a reflector having a surface parallel to a surface of the first common substrate;

(c) the optical demultiplexer having a transport region between the first plurality of the optical structures and the reflector, and an aperture disposed at at least one end of the transport region, wherein the first plurality of optical structures are disposed along a length of the transport region; and (d) wherein, when the input optical signal is provided to the aperture, output optical signals associated with the first and second different optical channels are generated at separate positions along the length of the transport region.

19. A method of separating an input optical signal into a plurality of channels by wavelength, the method comprising the steps of:

(a) providing a first plurality of optical structures formed simultaneously using vapor deposition on different regions of a first common substrate, each optical structure in the first plurality being comprised of a plurality of thin-film layers, wherein a first optical structure in the first plurality has a first substantially uniform thickness that is associated with first optical channel, a second optical structure in the first plurality has a second substantially uniform thickness that is associated with a second optical channel that is different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, the first end of the gradient transition region having a thickness equal to the first substantially uniform thickness, the second end of the gradient transition region having a thickness equal to the second substantially uniform thickness, and wherein the thickness of the entire gradient transition between the first end and the second end is greater than or equal to the first substantially uniform thickness and less than or equal to the second substantially uniform thickness;

(b) providing a reflector having a surface parallel to a surface of the first common substrate;

(c) providing a transport region between the first plurality of the optical structures and the reflector, and an aperture disposed at least one end of the transport region, wherein the first plurality of optical structures are disposed along a length of the transport region; and (d) generating at separate positions along the length of the transport region output optical signals associated with the first and second different optical channels when the input optical signal is provided to the aperture.

20. An optical multiplexer that combines a plurality of different wavelength input optical signals to form a combined signal at an output aperture, comprising:

(a) a first plurality of optical structures formed simultaneously on different regions of a first common substrate using vapor deposition, each optical structure in the first plurality being comprised of a plurality of thin-film layers, wherein first optical structure in the first plurality has a first substantially uniform thickness that is associated with a first optical channels, a second optical structure in the first plurality has a second substantially uniform thickness that is associated with a second optical channel that is different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, the first end of the gradient transition region having a thickness equal to the first substantially uniform thickness, the second end of the gradient transition region having a thickness equal to the second substantially uniform thickness, and wherein the thickness of the entire gradient transition between the first end and the second end is greater than or equal to the first substantially uniform thickness and less than or equal to the second substantially uniform thickness;

(b) a reflector having a surface parallel to a surface of the first common substrate;

(c) the optical multiplexer having a transport region between the first plurality of optical structures and the reflector, and at least one output aperture disposed at one end of the transport region, wherein the first plurality of optical structures are disposed along a length of the transport region; and (d) wherein, when the input optical signals are respectively provided to the first and second optical structures at the separate positions, a plurality of signals at least two of which corresponds to the first and second different optical channels are merged in the transport region to form the combined signal which is outputted from the multiplexer through the at least one output aperture.

21. A method of combining a plurality of different wavelength input optical signals to form a combined signal at an output aperture, comprising:

(a) providing a first plurality of optical structures formed simultaneously on different regions of a first common substrate using vapor deposition, each optical structure in the first plurality being comprised of a plurality of thin-film layers, wherein each of the plurality of thin-film layers in at least a first optical structure in the first plurality has a first substantially uniform thickness that is associated with a first channel, each of the plurality of thin-film layers in at least a second optical structure in the first plurality has a second substantially uniform thickness that is associated with a second optical channel different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, each of the plurality of thin-film layers in the gradient transition region having a thickness equal to the first substantially uniform thickness at the first end, each of the plurality of thin-film layers in the gradient transition region having a thickness equal to the second substantially uniform thickness at the second end, and wherein the thickness of each of the plurality of thin-film layers throughout the gradient transition region is greater than or equal to the first substantially uniform thickness and less than or equal to the second substantially uniform thickness;

(b) providing a reflector having a surface parallel to a surface of the first common substrate;

(c) providing a transport region between the first plurality of optical structures and the reflector, and at least one output aperture disposed at one end of the transport region, wherein the first plurality of optical structures are disposed along a length of the transport region;

(d) merging, in the transport region, a plurality of signals each one of which corresponds to one of the different optical channels when the input optical signals are respectively provided to the first and second optical structures at the separate positions, in order to form the combined signal; and (e) outputting the combined signal through the at least one output aperture.

22. A method of combining a plurality of different wavelength input optical signals to form a combined signal at an output aperture, comprising:

(a) providing a first plurality of optical structures formed simultaneously on different regions of a first common substrate using vapor deposition, each optical structure in the first plurality being comprised of a plurality of thin-film layers, wherein a first optical structure in the first plurality has a first substantially uniform thickness that is associated with a first optical channels, a second optical structure in the first plurality has a second substantially uniform thickness that is associated with a second optical channel that is different from the first optical channel, wherein a gradient transition region comprised of the plurality of thin-film layers is positioned between the first optical structure and the second optical structure, the gradient transition region having a first end adjacent to the first optical structure and a second end adjacent to the second optical structure, the first end of the gradient transition region having a thickness equal to the first substantially uniform thickness, the second end of the gradient transition region having a thickness equal to the second substantially uniform thickness, and wherein the thickness of the entire gradient transition between the first end and the second end is greater than or equal to the first substantially uniform thickness and less than or equal to the second substantially uniform thickness;

(b) providing a reflector having a surface parallel to a surface of the first common substrate;

(c) providing a transport region between the first plurality of optical structures and the reflector, and at least one output aperture disposed at one end of the transport region, wherein the first plurality of optical structures are disposed along a length of the transport region;

(d) merging, in the transport region, a plurality of signals each one of which corresponds to one of the different optical channels when the input optical signals are respectively provided to the first and second optical structures at the separate positions, in order to form the combined signal; and (e) outputting the combined signal through the at least one output aperture.

* * * * *